AUTOMATIC GAIN CONTROL CIRCUIT FOR PHOTOCELL AMPLIFIERS USING VARIATION OF FORWARD BIAS ACROSS PHOTOCELL

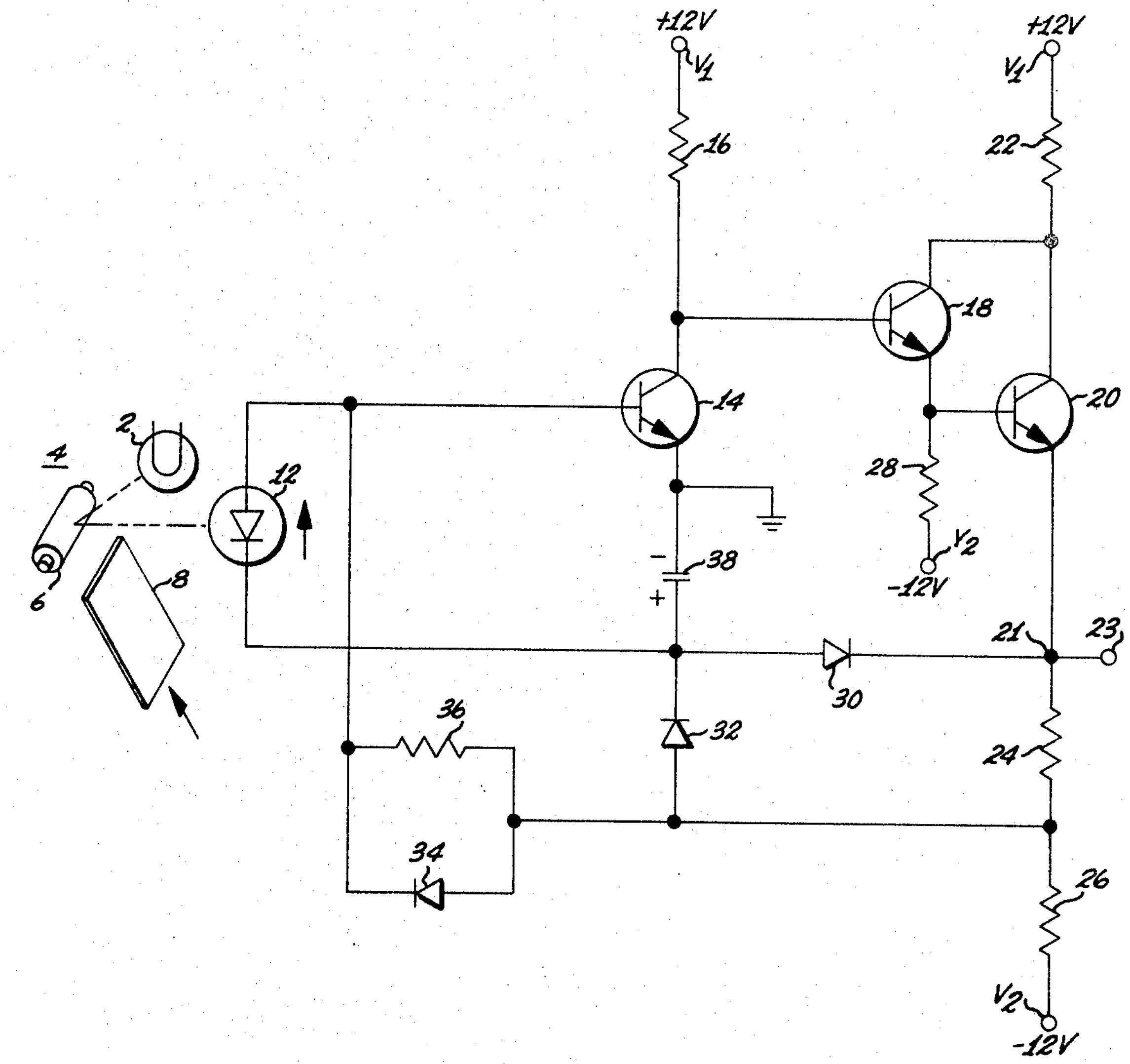
INVENTOR.
RICHARD E. MILFORD 3,519,828

Richard E. Milford, Phoenix, Ariz., assignor to General Electric Company, a corporation of New York Filed Aug. 9, 1968, Ser. No. 751,581
Int. Cl. H01j *39/12*
U.S. Cl. 250—214 11 Claims

ABSTRACT OF THE DISCLOSURE

An automatic gain control circuit for photocell amplifiers includes means for automatically adjusting the gain of the photocell so that the output signal from the amplifier remains substantially constant for a wide variation in the level of light falling on the photocell.

BACKGROUND OF THE INVENTION

This invention relates to photocell amplifiers and, more particularly, to an automatic gain control circuit for such amplifiers.

Input peripheral equipment for data processing systems now includes document readers which permit entering data into the system by scanning either printed, alphanumerical characters having a specially-configured type font or marks pencilled in appropriate areas on the document. Generally, the scanning circuitry for such document readers employs optical sensing equipment which includes a light source, a read station including means providing a semi-dark background when no document is present in the reader, means furnishing transport of documents through the read station, and a photocell and amplifier circuit responsive to light variations produced by the semi-dark background, the document surface, and the printed characters or pencilled marks thereon.

In order to assure maximum reliability and accurate reading of the data on each document, it is desirable that the document stock utilized have a specified range of surface reflectivity, as contrasted with that of the printed or pencilled characters thereon. Although the reflectivity or "darkness" of the printed characters can be controlled within fairly precise boundaries, the surface reflectivity of pencilled marks widely varies.

In addition, pencilled mark sensing applications may include parallel rows of spaces, one row for each character, extending across the document surface. By placing an appropriate pencilled mark in a single vertical column of the spaces, a particular character may be indicated. When mistakes are made by the person marking the document, erasures of such mistakes are generally incomplete so that the erased area has a surface reflectivity near that of the desired, pencilled mark. Moreover, dirt, smudges, fingerprints, and other distortions may appear on the document and appear within some of the spaces reserved for character indication.

Changes may also occur in the intensity of light incident upon the documents, such as variations in the intensity of light emitted by the light source, physical displacement in lens systems, dust or other distorting factors, or variations in the positioning of the read station or in the documents fed therethrough. Also, variations among photocells of a given type may effect in a nonpredictable manner the input signal fed to the document reader.

Therefore, it is essential that the optical sensing equipment for these document readers be capable of correctly operating with wide variations in light intensity incident upon the photocells thereof, and additionally, in mark sensing applications, of discriminating between pencilled marks and "gray" marks comprising erasures, dirt, etc.

Previous attempts to solve these problems have resulted in circuits including a large number of components. Particularly in mark sensing applications wherein it is desirable to provide a separate photocell and amplifier circuit for each character row on the document, the cost incurred by the use of such prior circuits places such a document reader at a competitive disadvantage. More seriously, however, these prior circuits have not fully satisfied or solved the problems arising from "gray" marks and variations in light intensity. For example, the acceptable range of intensity variation for a constant output in such circuits has generally been in the range of 40 to 1. In such a case, discrimination between "gray" marks is severely limited and in addition, low level reflected modes of operation are excluded. Accordingly, the light source must be operated at a higher intensity and thus a higher power, resulting in increased cost and shorter effective source life. Moreover, it has been found necessary in such instances to additionally regulate the source intensity by means of separate circuitry.

SUMMARY OF THE INVENTION

It is an object of this invention to provide a photocell and amplifier circuit for a document reader which furnishes automatic gain control of the photocell output with variations in light intensity incident upon the cell.

It is another object of this invention to provide a photocell and amplifier circuit for a document reader which provides such automatic gain control and yet uses a minimum of components.

It is a further object of this invention to provide a photocell and amplifier circuit for a document reader which provides both automatic gain control of the photocell output and which preserves in analog form variation in output with changes in the intensity of light reflected from printed characters, pencilled marks and "gray" marks upon the document.

It is yet a further object of this invention to provide a photocell and amplifier circuit which establishes a certain gain of the photocell which depends on surface reflectivity of the document being read, and which maintains that gain throughout the entire document length or over a reading interval.

These objects and others evident from a consideration of the following specification are achieved, briefly, by establishing an average forward bias across the photocell during an initial portion of the document being read, then maintaining that bias across the cell throughout the document's length, whereby the gain of the photocell is constant with changes in maximum light intensity incident thereon.

BRIEF DESCRIPTION OF THE DRAWINGS

The subject matter of this invention is particularly pointed out and distinctly claimed in the concluding portion of the specification. The invention both as to organization and method of operation may best be understood by reference to the following description taken in conjunction with the accompanying drawing in which the sole figure illustrates a preferred embodiment of the automatic gain control circuit.

DESCRIPTION OF THE PREFERRED EMBODIMENT

Referring now to the figure, optical sensing equipment includes a light source 2 which directs light towards a reading station 4 which includes means providing a semi-dark background, such as a rubber roller 6. Documents 8 are transported through read station 4 by a suitable transport mechanism, not illustrated. In read station 4, three conditions of reflected light may occur: when no document is present in the station, a minimum amount of light from the source 2 is reflected by the semi-dark background including roller 6; when a document has entered the read station 4, a maximum amount of light from the source 2 is reflected when incident upon the unmarked document surface; finally, an amount of light intermediate these minimum and maximum levels is reflected when light is incident upon either a printed character, a pencilled mark, or a "gray" mark on the document surface.

In this manner, reflected light is directed from the read station 4 towards a photocell 12. Although the ensuing description will be made in terms of a silicon photocell, it is to be clearly understood that the invention is not limited thereto and that any photocell having photovoltaic properties, as hereinafter explained is suitable.

The anode of photocell 12 is connected to the control electrode of an amplification stage comprising a first transistor 14 whose emitter electrode is connected to a source of reference potential, such as ground. The collector of transistor 14 is coupled through a resistor 16 to a first voltage source $V_1$, such as a +12 v. The collector of transistor 14 is also connected to the base electrode of a transistor 18 which is connected in an emitter-follower configuration with a transistor 20. The emitter of transistor 20, designated as junction point 21, serves as an output point for the photocell and amplifier circuit. The collectors of both transistor 18 and transistor 20 are coupled through a current limiting resistor 22 to voltage source $V_1$.

The emitter of transistor 20 is coupled through a pair of feedback resistors 24 and 26 to a second voltage source $V_2$, such as −12 v. With the transistor configurations illustrated in the figure, voltage source $V_2$ should preferably be negative with respect to both the reference potential and voltage source $V_1$. Also, resistors 24 and 26 may be replaced by a suitable potentiometer resistor. Biasing for the emitter-follower configuration including transistors 18 and 20 is provided by a resistor 28 connected between the emitter of transistor 18 and the second biasing voltage source $V_2$.

Two feedback paths from junction point 21 to the cathode electrode of silicon photocell 12 are illustrated. A first path comprises a diode 30 having its cathode electrode connected to junction point 21 and its anode electrode connected to the cathode of silicon photocell 12. In steady-state, diode 30 is reverse-biased by a positive output appearing at point 21. A second path includes a diode 32 connected from the common junction of resistors 24 and 26 to the cathode electrode of silicon photocell 12 and poled to conduct from the resistors 24 and 26 to the photocell 12.

Also connected to the common junction of resistors 24 and 26 are a diode 34 and a shunt-connected resistor 36 which are additionally coupled to the base or control electrode of transistor 14. Finally, a forward voltage biasing means, in this case a capacitor 38, is coupled between the source of reference potential and the cathode electrode of photocell 12.

The function of each of these described elements will now be explained in detail. The silicon photocell 12 can be visualized as including a diode portion connected as illustrated in the figure and a current generator in shunt therewith, the current generator representing reverse leakage current which is produced by light incident upon the photocell surface. Such a schematic description is illustrative of the photovoltaic effect, more completely described in Millman, Vacuum Tube and Semiconductor Electronics, published by McGraw-Hill, 1958, pp. 152 through 154. With the connections illustrated in the figure, the current generator produces reverse leakage current in the direction of the indicated arrow, or towards the base or control electrode of transistor 14.

The forward resistance of the diode portion of the photocell is determined by the bias voltage across the photocell. When the photocell is reverse biased the resistance of the diode portion is high. When the photocell is forward biased the resistance of the diode portion decreases as the forward bias voltage increases. Thus, the amount of reverse leakage current which is shunted through the diode portion can be controlled by controlling the forward bias voltage across the photocell.

Since the reverse leakage current is proportional to the amount of light incident upon the photocell surface, prior automatic gain control circuits generally have sought to maintain the diode portion of photocell 12 at a neutral or at a reverse bias to eliminate any effects of that portion upon the current generator. In distinction to these prior circuits, this invention utilizes the fact that if the diode portion is forward biased in response to the surface reflectivity of a document, and thereafter maintained at that forward bias throughout the document length, or throughout a succeeding series of documents, that any variations in light intensity and thus changes in the reverse leakage current of the photocell may be shunted by the diode portion, thereby maintaining an average constant gain on the photocell.

When minimum light is incident upon the photocell 12, as in the first afore-mentioned condition, very little current is produced by the current generator and therefore the transistor 14, due to the polarity of connections shown in the figure, is practically cut off, being maintained slightly conducting by a current being fed back from the common juncture of resistors 24 and 26 through the shunt connection of diode 34 and resistor 36. The values of these components are chosen to maintain the output voltage at point 21 at a maximum value of +V in such a condition. With minimum light incident upon photocell 12, feedback through diode 32 charges capacitor 38 to a voltage which places an initial forward bias upon the diode portion of silicon photocell 12.

When a document enters the read station and the second or maximum reflected light condition is present, the amount of reverse leakage current generated increass rapidly, causing transistor 14 to heavily conduct. Because of the emitter follower configuration and the denoted connections, transistors 18 and 20 conduct less heavily, and thus the output voltage present at point 21 drops. When the voltage at point 21 drops slightly below the reference potential, diode 30 becomes forward biased and a discharge path for capacitor 38 is then formed through diode 30, point 21, and through resistors 24 and 26 to the voltage source $V_2$. As capacitor 38 discharges the voltage of the polarity shown across capacitor 38 decreases so that the value of the positive voltage applied to the cathode of photocell 12 decreases. This causes an increase in the forward bias impressed across the diode portion of photocell 12 thereby increasing its conductivity and further shunting the current generator portion thereof. This process continues, with reduction in the amount of current supplied to the base electrode of transistor 14, until that current is sufficient to maintain point 21 at a minimum value of reference potential.

In this operation, it is desirable that capacitor 38 discharge quickly through diode 30 to establish an average forward bias, and that capacitor 38 then maintain its charge for the duration of the document. Diodes 32 and 34 are now reversed biased and present high resistance paths to the charge on capacitor 38. Once having established an average forward bias, that bias may be maintained essentially constant during the subsequent reading interval.

The process just described assures that the gain of the photocell 12 is reduced in direct proportion to the change in light intensity incident between the first and second conditions. With junction point 21 at reference potential, diode 30 is placed in a nonconducting condition and no discharge path for capacitor 38 thereafter exists.

Because the minimum amount of light incident upon photocell 12 is reflected from a semi-dark background, any change in photocell gain is dependent upon the maximum surface reflectivity of the document being read. Once having established this gain, the photocell and amplifier circuit in the figure may then proceed to sense printed characters and pencilled marks upon the document, as in the third condition. During this mode of operation, variations in incident light intensity cause corresponding variations in reverse leakage current thereby proportionally changing the conduction state of transistor 14, and transistors 18 and 20, to provide a proportional output voltage variation at junction point 21. By proper design, the circuitry in the figure can provide proportional output variation with a change in the maximum intensity of 100 to 1, varying from a reference potential output with maximum light intensity to an output of +V with minimum light intensity. Since the period of time in which data or gray marks are sensed is small, compared with the charging time of capacitor 38 in the third condition, the gain of photocell 12 is maintained essentially constant throughout the document. The capacitor 38 may be recharged at a very slow rate; however, this recharge is not sufficient to substantially effect the gain throughout a document length.

By thus providing an analog or proportional indication at junction point 21 of gray marks present upon the document surface the photocell and amplifier circuit may provide, in combination with similar circuits, a means for comparison of surface reflectivities to ascertain the intended pencilled mark.

At the end of the document being scanned, the first condition is again present as minimum light is incident upon the photocell 12. Accordingly, the reverse leakage current decreases until transistor 14 is again near the cutoff condition. The output voltage at point 21 rises to approximately +V, the value of this voltage again being limited by feedback through resistors 24 and 26 and the forward biasing of diodes 32 and 34. When this darkened or first condition occurs, capacitor 38 quickly recharges by means of current flow through diode 32, and thus the gain of photocell 12 is quickly increased. However, as the initial or leading edge of a succeeding document enters read station 4, and the gain of photocell 12 is quickly reduced to a value required by the surface reflectivity of that document in the manner previously described.

From the foregoing discussion, it is evident that if diode 32 were removed from the circuitry of the figure after an initial forward bias for a series of particular documents being read had been established across the diode portion of photocell 12, that a slowly increasing gain would thereafter be maintained throughout a reading interval involving scanning of several documents following the maximum reflectivity document in the series.

Certain other modifications are readily apparent to one skilled in the art. As described, the primary function of diode 34 and resistor 36 is to establish the voltage +V present at junction point 21 when the first steady-state dark condition is present. Additionally, feedback resistor 36 controls bandwidth of the amplifier when in the linear range. If it were desirable to use the photocell and amplifier circuit of this invention in card reading applications, wherein each document includes a plurality of apertures arranged in a coded fashion, resistor 36 could be coupled between the first voltage source $V_1$ and the base of transistor 14. In such applications, the light source 2 is directed at the photocell 12. Therefore, the steady-state light incident upon the photocell is maximum light intensity and this condition is encountered whenever no card is present in the read station 4 or whenever an aperture of that card is interposed between the light source 2 and the photocell 12. By connecting bias resistor 36 to the first voltage source $V_1$, the point 21 provides a reference potential output whenever the maximum light condition is present. When a card enters the read station 4, and interrupts the light transmission path between light source 2 and photocell 12 the voltage at junction point 21 rises to the +V level.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What I claim and desire to secure by Letters Patent is:

1. A circuit useful in optical sensing equipment comprising:

(a) a photocell;

(b) amplifying means, coupled to said photocell, for producing at its output a signal whose value is proportional to the output signal of said photocell; and (c) means, coupled between the output of said amplifying means and said photocell, for establishing from the signal at said amplifying means output an average forward bias across said photocell in response to the change in light intensity incident thereon between a minimum and a maximum light condition.

2. The circuit of claim 1, wherein said means for establishing an average forward bias further includes means maintaining such forward bias across said photocell for a relatively long time with respect to the time necessary to establish such forward bias.

3. The circuit of claim 2, wherein said means maintaining further includes means for varying the gain of said photocell in response to changes in the maximum light intensity incident thereon.

4. An automatic gain control circuit for an optical sensing means which comprises a photocell having an output responsive to variations in light intensity incident thereon, and an amplifier therefor, including:

(a) means connected in circuit with the photocell for applying a forward bias voltage thereacross, said means for applying a forward bias voltage being coupled to said photocell; and (b) means coupled between the amplifier output and said means for applying a forward bias for controlling the value of said forward bias voltage to establish an average forward bias across the photocell in response to a change in amplifier output level between minimum and maximum light intensities incident thereon.

5. The automatic gain control circuit of claim 4, wherein said means for controlling maintains said average forward bias voltage across the photocell when the light intensity thereon varies intermediately between said minimum and maximum levels.

6. The automatic gain control circuit of claim 5, wherein said means for applying a forward bias voltage comprises a capacitor.

7. The automatic gain control circuit of claim 6, wherein said means for controlling the value of said forward bias comprises a first diode coupled from the amplifier output to one terminal of said capacitor, said first diode being poled to discharge said capacitor when the voltage on the amplifier output varies in response to a change in light intensity incident on the photocell between said minimum and maximum levels, and a second diode coupling the amplifier output to said terminal of said capacitor and being poled to charge said capacitor to a voltage representative of said minimum light level.

8. The automatic gain control circuit of claim 4, wherein said means for controlling the value of said forward bias maintains said average forward bias voltage for a relatively long time with respect to the time necessary to establish said bias.

9. The automatic gain control circuit of claim 8, wherein said means for applying a forward bias voltage comprises a capacitor.

10. The automatic gain control circuit of claim 9, wherein said means for controlling the value of said forward bias includes a first diode coupled from the amplifier output to one terminal of said capacitor, said first diode being poled to discharge said capacitor when the voltage on the amplifier output varies in response to a change in light intensity incident on the photocell between said minimum and maximum levels.

11. An optical sensing circuit for document readers comprising:

(a) a photocell having an output which includes a generated current proportional to variations in light intensity incident thereon between minimum and maximum levels;

(b) an amplification stage coupled to the output of said photocell and producing at an output terminal thereof a signal which varies inversely with respect to said generated current;

(c) a capacitor connected in circuit with said photocell;

(d) a first diode, coupled from said output terminal of said amplification stage to one terminal of said capacitor, said first diode being poled to provide a discharge path for said capacitor when such output signal drops below a predetermined, minimum value; and (e) a second diode, coupled from said output terminal of said amplification stage to said terminal of said capacitor, for providing a charge path for said capacitor when said output signal reaches a predetermined, maximum value.

References Cited

UNITED STATES PATENTS

| | | | |
|---|---|---|---|
| 3,379,991 | 4/1968 | Clerc et al. | 250—214 |
| 3,421,007 | 1/1969 | Schwartz | 250—214 |

ARCHIE R. BORCHELT, Primary Examiner

M. ABRAMSON, Assistant Examiner

U.S. Cl. X.R.

250—219; 307—311